United States Patent [19]
Levy et al.

[11] 3,888,922
[45] June 10, 1975

[54] STABILIZING ACRYLIC ACID WITH ALKYLATED PHENOLS

[75] Inventors: Leon B. Levy; Gene J. Fisher, both of Corpus Christi, Tex.

[73] Assignee: Celanese Corporation, New York, N.Y.

[22] Filed: Apr. 30, 1973

[21] Appl. No.: 355,390

[52] U.S. Cl. .......................................... 260/526 N
[51] Int. Cl. ............................................ C07f 69/54
[58] Field of Search ................................ 260/526 N

[56] References Cited
UNITED STATES PATENTS

| | | | |
|---|---|---|---|
| 2,105,284 | 1/1938 | Groll et al. | 260/526 N |
| 3,150,166 | 9/1964 | Pohlemann et al. | 260/526 N |
| 3,493,471 | 2/1970 | Bashaw | 260/526 N |
| 3,555,082 | 1/1971 | Sennewald et al. | 260/526 N |

*Primary Examiner*—Lorraine A. Weinberger
*Assistant Examiner*—Richard L. Raymond
*Attorney, Agent, or Firm*—Leonard Horn; Ralph M. Pritchett

[57] ABSTRACT

Acrylic acid is stabilized against vinyl-type polymerization with alkylated phenols such as butylated hydroxytoluene or butylated hydroxyanisole, both of which, at suitable levels, are acceptable for incorporation into foods, drugs and cosmetics.

6 Claims, No Drawings

STABILIZING ACRYLIC ACID WITH ALKYLATED PHENOLS

The present invention relates to the stabilization of acrylic acid against vinyl-type polymerization.

Acrylic acid is a widely used chemical employed in the production of homopolymers and copolymers, esters and amides, and other more complex derivatives. As such, or in the form of a polymeric or other derivative, it is widely used in paints, coatings, lacquers, molded objects, synthetic fibers, foods, drugs and cosmetics. The same olefinic reactivity which makes it useful for many purposes, however, also poses a problem of unintentional or premature polymerization. This tendency is exhibited even during purification of the acrylic acid where distillations at higher temperatures may be involved.

There are two mechanisms whereby acrylic acid undergoes polymerization. The first mechanism involves the addition of a carboxyl group across an olefinic double bond. This results in the formation of a polyester, an example of which is the acrylic acid dimer β-acryloxypropionic acid. This polyester formation exhibits a constant rate at a given temperature and is not amenable to control by the addition of commonly used inhibitors.

The second, or vinyl-type polymerization, to which the present invention is primarily directed and which presents the greater problem, is not usually a smooth, gradual process. That is, it may be characterized by a prolonged period without visible change (induction period) followed by a rapid, accelerated formation of insoluble polymer. During the latter process the entire sample may be completely transformed to a solid or a gel.

Accordingly, it has often been the practice to employ stabilizers or inhibitors to inhibit the setting of acrylic acid. One material which has been found suitable for this purpose is phenothiazine. It is effective in low percentage and is quite inexpensive. Unfortunately, it imparts a green color even in small amounts which therefore excludes its use in areas where color is a problem. Alternatively, it requires removal of the stabilizer as by distillation which is obviously an extra expense. In addition, even if color is not a problem, phenothiazine is not suitable for use in applications where the product is to be applied to the skin or, especially, to be ingested.

There are other materials which have been used to stabilize unsaturated materials but these suffer from the same shortcomings as phenothiazine to varying degrees. Equally important, they are often quite expensive which alone precludes their use for practical purposes.

It is accordingly an object of the present invention to provide means for stabilizing acrylic acid against polymerization in inexpensive manner without deleteriously affecting its color.

Another object of the invention is to stabilize acrylic acid with a material which is pharmacologically acceptable so that the acrylic acid may be used in food, drug or cosmetic applications.

These and other objects and advantages are realized in accordance with the present invention pursuant to which acrylic acid is stabilized with at least about 0.001% its weight of a branched lower alkyl-substituted phenol, especially a branched lower alkyl-substituted lower alkyl or lower alkoxy phenol. Preferred stabilizers include mono- and di-branched butyl- methyl- or methoxy-phenols, e.g. butylated hydroxytoluene (2,6-di-t-butyl-p-cresol), butylated hydroxyanisole (2- and 3-t-butylhydroquinone monomethyl ether), and the like. Advantageously the stabilizer is present in about 0.001 to 0.5% by weight and preferably about 0.002 to 0.2% by weight of the acrylic acid. Extremely high stabilizer concentrations, i.e. concentrations of several weight percent higher than those just named, can be allowed to exist if desired (as in the bases of distillation towers), but such concentrations are not necessary. These stabilizers are highly effective, impart no color and are generally regarded as acceptable for use in food, drug and cosmetic applications. Moreover, butylated hydroxytoluene is very inexpensive.

It is a special advantage of the invention that the novel acrylic acid-stabilizer compositions are stable in the presence of oxygen as well as in its absence.

The acrylic acid may be the only material present in admixture with the stabilizer, or else solvents, diluents and/or other monomers may be admixed therewith as well as alcohols (which may be mixed with the acrylic acid for the purpose of preparing the corresponding acrylate esters). Illustrative diluents and/or other materials which may be present include alkanols such as ethyl alcohol; acetone; acrylate esters such as ethyl acrylate; acrylonitrile; dimethylformamide; water; mixtures of the foregoing, and the like.

Similarly the stabilizer may comprise butylated hydroxytoluene or butylated hydroxyanisole alone or in admixture with one another, or in admixture with other stabilizers. By blending with other stabilizers it may be possible to reduce the amount of such other stabilizers below a level at which they become unsatisfactory because of price, toxicity, color, or the like.

In accordance with one particular aspect of the invention conventional stabilizers may be used in plant processing and purification of acrylic acid because of their cost, stability to processing conditions, or possibly even because their color serves as an indicator of their presence. Such stabilizers at some stage may then be removed in whole or in part and replaced by the stabilizers of the present invention.

Acrylic acid so stabilized can nonetheless be polymerized subsequently by removal of the stabilizer, as by distillation, or by addition of polymerization catalysts which destroy or overcome the inhibitory action of the butylated hydroxytoluene or butylated hydroxyanisole. The polyacrylic acid can be used as a component of emolients and creams to be brought into contact with the skin or with membranes of the body for drug or cosmetic purposes. Similarly, it may be a thickening agent for liquids to be employed for therapeutic purposes, being combined with cations which may be therapeutically active.

The invention will be further described in the following illustrative examples wherein all parts are by weight unless otherwise expressed.

EXAMPLE I

Glacial acrylic acid which has been purified by distillation to remove the inhibitor was poured into open test tubes immersed in oil baths whose temperature was controlled ±1°C. The samples were heated at different temperatures until they underwent a relatively sudden setting, passing from liquid to gel state. The average results of several trials are set forth in Table I.

TABLE I

| Temp.,°C | Average Set Time, Hours |
|---|---|
| 80 | 1.9 |
| 100 | 0.5 |
| 120 | 0.08 |

EXAMPLE II a. Two samples of acrylic acid purified as above were put in 250 ml Erlenmeyer flasks which were placed in a covered box and set in a hood at room temperature. Aliquot portions were removed periodically and flash-evaporated to ascertain the proportion which was non-volatile. The non-volatiles in one sample during 63 days increased from 0.015 weight percent initially to 1.05 weight percent for an average increase of 0.016%/day. These non-volatile products were predominantly short-chain polyester formed by reaction between the carboxyl group and the vinyl moiety rather than vinyl-type polymers. The other sample increased in non-volatiles at about the same rate until the 43rd day and then the rate accelerated, reaching a level of 2.49% on the 49th day. By the 63rd day the non-volatiles constituted 40.5%. The rate acceleration on the 43rd day resulted from the inception of vinyl-type polymerization.

b. To two samples of acrylic acid, butylated hydroxytoluene was added to the extent of 192 ppm and they were tested as in (a). From initial non-volatile values of of 0.02 and 0.04 weight percent, both samples increased to 1.56% after 119 days, for an average increase of 0.013%/day. This indicated that the formation of vinyl-type polymer had been inhibited, only the expected rate of polyester formation having been observed.

c. The test of (b) was repeated except that in place of the butylated hydroxytoluene there was employed as stabilizer or inhibitor 182 ppm of monomethyl ether of hydroquinone (MEHQ). The non-volatiles increased over 119 days from 0.61 and 0.76 weight percent to 2.46 and 2.35 weight percent, respectively, for an average increase of 0.014%/day.

EXAMPLE III

Air was sparged into glacial acrylic acid containing 200 ppm of butylated hydroxytoluene at a rate of 10 cc/minute. Samples were maintained at various temperatures and the set times were measured. The results are set forth in Table 2.

TABLE 2

| Temp.,°C | Average Set Time, Hours |
|---|---|
| 80 | >12 |
| 100 | 4.1 |
| 120 | 0.9 |

When 200 ppm of MEHQ was used as inhibitor at 100°C under the same conditions as above, the average set time observed was 4.3 hours.

EXAMPLE IV

Example III was repeated employing, in place of the 200 ppm of butylated hydroxytoluene, 100 and 200 ppm of butylated hydroxyanisole (BHA). The results are set forth in Table 3.

TABLE 3

| PPM, BHA | Temp.,°C | Average Set Time, Hours |
|---|---|---|
| 100 | 100 | 2.2 |
| 200 | 100 | >12 |
| 200 | 120 | 2.2 |

In connection with the foregoing it is to be noted that butylated hydroxytoluene and butylated hydroxyanisole in particular are acceptable as food additives when employed within specified concentration limits. See, for example, Furia's "Handbook of Food Additives", published by The Chemical Rubber Company, Cleveland, Ohio (1968).

It will be appreciated that the instant specification and examples are set forth by way of illustration and not limitation, and that various modifications and changes may be made without departing from the spirit and scope of the present invention.

The embodiments of the invention in which an exclusive property or privilege is claimed are defined as follows:

1. A composition consisting essentially of acrylic acid stabilized with at least about 0.001% its weight of at least one stabilizing branched lower alkyl-substituted phenol which is a member of the group consisting of tri-lower alkyl phenols and lower alkyl-lower alkoxy phenols.

2. The composition according to claim 1 wherein the phenol is a branched lower alkyl-substituted methyl- or methoxy-phenol.

3. The composition of claim 1 wherein the stabilizer is present in an amount of about 0.001 to 0.5% by weight of the acrylic acid.

4. The composition of claim 2 wherein the stabilizer is a member of the group consisting of butylated hydroxytoluene, butylated hydroxyanisole, and mixtures thereof.

5. The composition of claim 4 wherein the stabilizer is butylated hydroxytoluene present in an amount of about 0.001 to 0.5% by weight of the acrylic acid.

6. The composition of claim 4 wherein the stabilizer is butylated hydroxyanisole present in an amount of about 0.001 to 0.5% by weight of the acrylic acid.

* * * * *